(12) United States Patent
Rousseaux et al.

(10) Patent No.: US 10,431,347 B2
(45) Date of Patent: Oct. 1, 2019

(54) MASTERBATCHES FOR PREPARING COMPOSITE MATERIALS WITH ENHANCED CONDUCTIVITY PROPERTIES, PROCESS AND COMPOSITE MATERIALS PRODUCED

(71) Applicant: TOTAL RESEARCH & TECHNOLOGY FELUY, Seneffe (BE)

(72) Inventors: Dimitri Rousseaux, Nivelles (BE); Olivier Lhost, Havré (BE); Philippe Lodefier, Wemmel (BE); Eddi Scandino, Gozée (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 601 days.

(21) Appl. No.: 14/908,728

(22) PCT Filed: Jul. 30, 2014

(86) PCT No.: PCT/EP2014/066389
§ 371 (c)(1),
(2) Date: Jan. 29, 2016

(87) PCT Pub. No.: WO2015/014897
PCT Pub. Date: Feb. 5, 2015

(65) Prior Publication Data
US 2016/0172071 A1 Jun. 16, 2016

(30) Foreign Application Priority Data

Aug. 1, 2013 (EP) .................... 13178973

(51) Int. Cl.
| | | |
|---|---|---|
| C08J 3/22 | (2006.01) | |
| C08K 7/24 | (2006.01) | |
| H01B 1/24 | (2006.01) | |
| C08J 3/20 | (2006.01) | |
| C08L 51/04 | (2006.01) | |
| C08L 55/02 | (2006.01) | |
| B29C 70/58 | (2006.01) | |
| B29C 70/88 | (2006.01) | |
| B32B 27/06 | (2006.01) | |
| B32B 27/30 | (2006.01) | |
| C08L 25/06 | (2006.01) | |
| H01B 3/44 | (2006.01) | |
| B82Y 30/00 | (2011.01) | |
| B29K 25/00 | (2006.01) | |
| B29K 105/16 | (2006.01) | |
| B29K 507/04 | (2006.01) | |

(52) U.S. Cl.
CPC .............. *H01B 1/24* (2013.01); *B29C 70/58* (2013.01); *B29C 70/882* (2013.01); *B32B 27/06* (2013.01); *B32B 27/302* (2013.01); *C08J 3/203* (2013.01); *C08J 3/22* (2013.01); *C08J 3/226* (2013.01); *C08K 7/24* (2013.01); *C08L 25/06* (2013.01); *C08L 51/04* (2013.01); *C08L 55/02* (2013.01); *H01B 3/442* (2013.01); *B29K 2025/06* (2013.01); *B29K 2105/16* (2013.01); *B29K 2507/04* (2013.01); *B32B 2307/206* (2013.01); *B82Y 30/00* (2013.01); *C08J 2309/00* (2013.01); *C08J 2325/06* (2013.01); *C08J 2325/10* (2013.01); *C08J 2327/06* (2013.01); *C08J 2333/12* (2013.01); *C08J 2351/04* (2013.01); *C08J 2355/02* (2013.01); *C08J 2367/02* (2013.01); *C08J 2369/00* (2013.01); *C08J 2371/12* (2013.01); *C08J 2379/02* (2013.01); *C08J 2381/06* (2013.01); *C08J 2425/06* (2013.01)

(58) Field of Classification Search
CPC .... H01B 1/24; C08J 3/22; C08J 3/226; C08K 7/24; C08L 25/00
See application file for complete search history.

(56) References Cited

U.S. PATENT DOCUMENTS

| | | | |
|---|---|---|---|
| 2007/0184969 A1* | 8/2007 | Dubois ................. | B82Y 30/00 502/152 |
| 2010/0240832 A1 | 9/2010 | Duc et al. | |
| 2011/0200773 A1* | 8/2011 | Kolditz ............... | C08L 23/0815 428/35.7 |
| 2012/0241686 A1* | 9/2012 | Bastiaens ................. | C08J 3/22 252/511 |
| 2012/0289656 A1 | 11/2012 | Knoeppel et al. | |

FOREIGN PATENT DOCUMENTS

| | | |
|---|---|---|
| JP | 2005139431 A | 6/2005 |
| KR | 20090071602 A | 7/2009 |
| WO | 2010098900 A1 | 9/2010 |
| WO | 2013107535 A1 | 7/2013 |

OTHER PUBLICATIONS

Decision for Grant of Patent issued in Korean Patent Application No. 2016-7002863, dated Feb. 27, 2017, 3 pages.

(Continued)

*Primary Examiner* — Kara B Boyle
(74) *Attorney, Agent, or Firm* — Albert Shung

(57) ABSTRACT

A masterbatch for use in a process of preparing a composite material may contain a blend of a first amorphous polymer with carbon nanotubes. At least 5% by weight of carbon nanotubes may be present in the masterbatch, based on a total weight of the masterbatch. The masterbatch may exhibit a high load melt flow index HLMI1 of less than 40 g/10 min determined at 200° C. under a load of 21.6 kg according to ISO1133. The first amorphous polymer may have a melt flow index MFI1 of at least 10 g/10 min determined at 200° C. under a load of 5 kg according to ISO1133H.

8 Claims, 2 Drawing Sheets

(56) References Cited

OTHER PUBLICATIONS

International Search Report issued in PCT/EP2014/066389, dated Sep. 18, 2014, 3 pages.
Plastics Additives Handbook, ed. H. Zweifel, 5th edition, 2001, Hanser Publishers.
Lee S., et al, "The influence of the processing conditions on the PS/MWCNT composites prepared with twin screw extruder", 68th Annual Technical Conference of the Society of Plastics Engineers 2010 (ANTEC 2010): Orlando, Florida, USA, May 16-20, 2010, pp. 1107-1110.
Office Action issued in Korean Patent Application No. 2016-7002863, dated Jun. 14, 2016, 14 pages.

* cited by examiner

MASTERBATCHES FOR PREPARING COMPOSITE MATERIALS WITH ENHANCED CONDUCTIVITY PROPERTIES, PROCESS AND COMPOSITE MATERIALS PRODUCED

CROSS-REFERENCE TO RELATED APPLICATIONS

This application is a National Stage Entry of PCT/EP2014/066389, filed on Jul. 30, 2014; which claims priority to EP 13178973.7, filed on Aug. 1, 2013; the entireties of which are incorporated herein by reference.

FIELD OF THE INVENTION

The present invention relates to masterbatches for preparing conductive composite materials comprising carbon nanotubes. The present invention also relates to process for the preparation of said masterbatches. The invention also relates to process preparing composite materials comprising carbon nanotubes using said masterbatches and to the composite materials produced.

BACKGROUND OF THE INVENTION

As electronic devices become smaller and faster, their sensitivity to electrostatic charges is increased and electronic packaging has been provided to improve electrostatically dissipative properties. Electronics packaging is designed to prevent the build-up of static electrical charges and the consecutive electrostatic discharge (ESD) which can be responsible of serious damages to sensitive electronics and result in product defects and high scrap rates.

In order to ensure ESD protection, inherently electrically insulating polymers may be rendered conductive or dissipative by incorporating conductive fillers—such as carbon black (CB)—allowing effective dissipation of static electrical charges.

Currently conductive or dissipative plastics are dominated by CB, mainly because CB is relatively cheap in comparison to other conductive fillers, such as carbon fiber, carbon nanotubes (CNT), metal fiber, metal-coated carbon fiber, and metal powder. Addition level of CB must be sufficient so that particles create a conductive pathway through the materials. In consequence, high levels of CB (15-30%) are required to meet the requirements, which alter critical physical properties of the basic polymer such as impact strength, elongation and compound viscosity.

These properties need to be preserved when using other fillers instead of CB as conductive fillers. Nevertheless, a minimum concentration is required to obtain the desired conductivity. Since other fillers are more expensive than CB, there remains a need to provide improved conductive compositions which are electrically insulating and remain costly attractive.

Conductive compositions containing CNT are known. Production of polymer T-composites can be done by physically mixing the polymer powder and the CNT for example by shear mixing techniques or by grinding. However a disadvantage of these methods is that the CNT are not well dispersed in the polymer.

SUMMARY OF THE INVENTION

It is therefore an object of the present invention to provide composite materials which are electrically conductive or dissipative with low content of CNT.

According to a first aspect, the invention provides a masterbatch for use in a process of preparing a composite material according to the invention. The masterbatch comprises a blend of a first amorphous polymer with carbon nanotubes, with at least 5% by weight of carbon nanotubes based on the total weight of the masterbatch as determined according to ISO 11358; and has a high load melt flow index $HLMI1$ of less than 40 g/10 min determined at 200° C. under a load of 21.6 kg according to ISO1133 and wherein the first amorphous polymer has a melt flow index $MFI1$ of at least 10 g/10 min determined at 200° C. under a load of 5 kg according to ISO1133H.

In a preferred embodiment, the invention provides a masterbatch for use in a process of preparing a composite material according to the invention. The masterbatch comprises a blend of a first amorphous polymer with carbon nanotubes, from 5% to 15% by weight of carbon nanotubes based on the total weight of the masterbatch as determined according to ISO 11358; and has a high load melt flow index $HLMI1$ of less than 40 g/10 min determined at 200° C. under a load of 21.6 kg according to ISO1133 and wherein the first amorphous polymer has a melt flow index $MFI1$ of at least 10 g/10 min determined at 200° C. under a load of 5 kg according to ISO1133H.

In a preferred embodiment, the masterbatch has a surface resistivity of at most $1 \times 10^2$ Ohm/sq as determined according to CEI 60167.

In a preferred embodiment, the masterbatch has a high load melt flow index $HLMI1$ of less than 30 g/10 min, preferably less than 20 g/10 min determined at 200° C. under a load of 21.6 kg according to ISO1133.

In a preferred embodiment, the masterbatch further comprises from 0.01 to 4.0 by weight of one or more additive based on the total weight of the masterbatch, the one or more additive being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide.

In a preferred embodiment, the first amorphous polymer is selected from polystyrene, acrylonitrile-butadiene-styrene, polycarbonate, styrene acrylonitrile, poly(methyl methacrylate), poly vinyl chloride), polybutadiene, polybutylene terephthalate, poly(p-phenylene oxide), polysulfone, polyethersulfone, polyethylenimine, polyphenylsulfone, acrylonitrile styrene acrylate or any combination thereof; preferably the first polymer is polystyrene and selected from polystyrene, modified polystyrene, or combination of polystyrene and modified polystyrene.

According to a second aspect, the invention provides a process of preparing a masterbatch, comprising the steps of:
  a1. providing carbon nanotubes;
  a2. providing an first amorphous polymer, said first amorphous polymer having a glass transition temperature $Tg1$; and a melt flow index of at least 10 g/10 min determined at 200° C. under a load of 5 kg according to ISO1133H, and optionally from 0.01 to 4.0 by weight of one or more additive based on the total weight of the masterbatch, the one or more additive being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide
  a3. blending together said carbon nanotubes and said first amorphous polymer by extrusion at a barrel temperature ranging from $Tg1$ to $Tg1+80°$ C., preferably $Tg1+5°$ C. to $Tg1+50°$ C., the glass transition temperature being determined according to ISO 11357-2:2013.

In a preferred embodiment, the step a3) of blending together said carbon nanotubes and said first amorphous polymer by extrusion is conducted on co-rotating twin screw extruder at a screw speed of at least 250 RPM, with preference at least 300 RPM.

The process is particularly suitable to produce a masterbatch according to the first aspect of the invention.

According to a third aspect, the invention provides a process for preparing a composite material comprising a polymer composition and carbon nanotubes, wherein said polymer composition comprises a mixture of a first and a second amorphous polymer and the composite material comprises from 0.05 to 1.95% by weight of carbon nanotubes based on the total weight of the composite material as determined according to ISO 11358, and further wherein the composite material has a surface resistivity of at most $1 \times 10^4$ Ohm/sq, said process comprising the steps of:

b. providing a masterbatch comprising a first amorphous polymer and at least 5%, and preferably from 5% to 15%, by weight of carbon nanotubes based on the total weight of the masterbatch as determined according to ISO 11358, and wherein the first amorphous polymer has a melt flow index MFI1 of at least 10 g/10 min determined at 200° C. under a load of 5 kg according to ISO1133H;

c. providing a second amorphous polymer having a glass transition temperature Tg2;

d. blending together the masterbatch and the second amorphous polymer by extrusion in an extruder at a barrel temperature ranging from Tg2+100° C. to Tg2+200° C., the glass transition temperature being determined according to ISO 11357-2:2013.

The masterbatch used is preferably a masterbatch according to the first aspect of the invention.

In a preferred embodiment, the process for preparing a composite material includes before the step b) of providing a masterbatch, a step of preparation of the masterbatch according to the second aspect of the invention.

In a preferred embodiment, the first amorphous polymer having a melt flow index MFI1 and second amorphous polymer having a melt flow index MFI2, the process further comprises the step of selecting the first and second amorphous polymer so that MFI1 has a value of at 1.5 least twice the value of MFI2.

In a preferred embodiment, said composite material comprises from 0.05 to 0.95% by weight of carbon nanotubes based on the total weight of the composite material as determined according to ISO 11358.

In a preferred embodiment, the first and/or second amorphous polymers are selected from polystyrene, acrylonitrile-butadiene-styrene, polycarbonate, styrene acrylonitrile, poly(methyl methacrylate), poly(vinyl chloride), polybutadiene, polybutylene terephthalate, poly(p-phenylene oxide), polysulfone, polyethersulfone, polyethylenimine, polyphenylsulfone, acrylonitrile styrene acrylate or any combination thereof.

In a preferred embodiment, at least one of the first or second amorphous polymer is polystyrene, said polystyrene being selected from polystyrene, modified polystyrene, or combination of polystyrene and modified polystyrene.

According to a fourth aspect the invention encompasses a composite material according to the invention comprises a polymer composition and carbon nanotubes (CNT), wherein said composite material:

comprises from 0.05 to 1.95% by weight of carbon nanotubes based on the total weight of the composite material as determined according to ISO 11358;

comprises a portion of carbon nanotubes being in the form of agglomerate, with the agglomerate area fraction being less than 2.5% as determined in accordance with ASTM D-2663-14, and has a surface resistivity of at most $1 \times 10^4$ Ohm/sq, preferably at most $9 \times 10^3$ Ohm/sq as determined according to CEI 60167.

Said composite material is preferably produced by the process according to the third aspect of the invention.

The invention also encompasses formed articles comprising the composite material according to the fourth aspect of the invention.

Thus, the invention provides an article made of a composite material as defined in the fourth aspect of the invention. Preferably, the article is a sheet.

Preferably the article is a monolayered sheet made of the composite material according to the invention or a multilayered sheet comprising at least two coextruded layers of different material wherein at least one of the layer is made of a composite material according to the invention, preferably the multilayered sheet comprises three layers, wherein at least one of the outer layers is made of a composite material according to the invention.

The invention also encompasses the use of the composite material according to the invention to make an article in a process selected from blow-moulding, injection, rotomoulding or injection blow moulding.

DETAILED DESCRIPTION OF THE INVENTION

Figure 1:
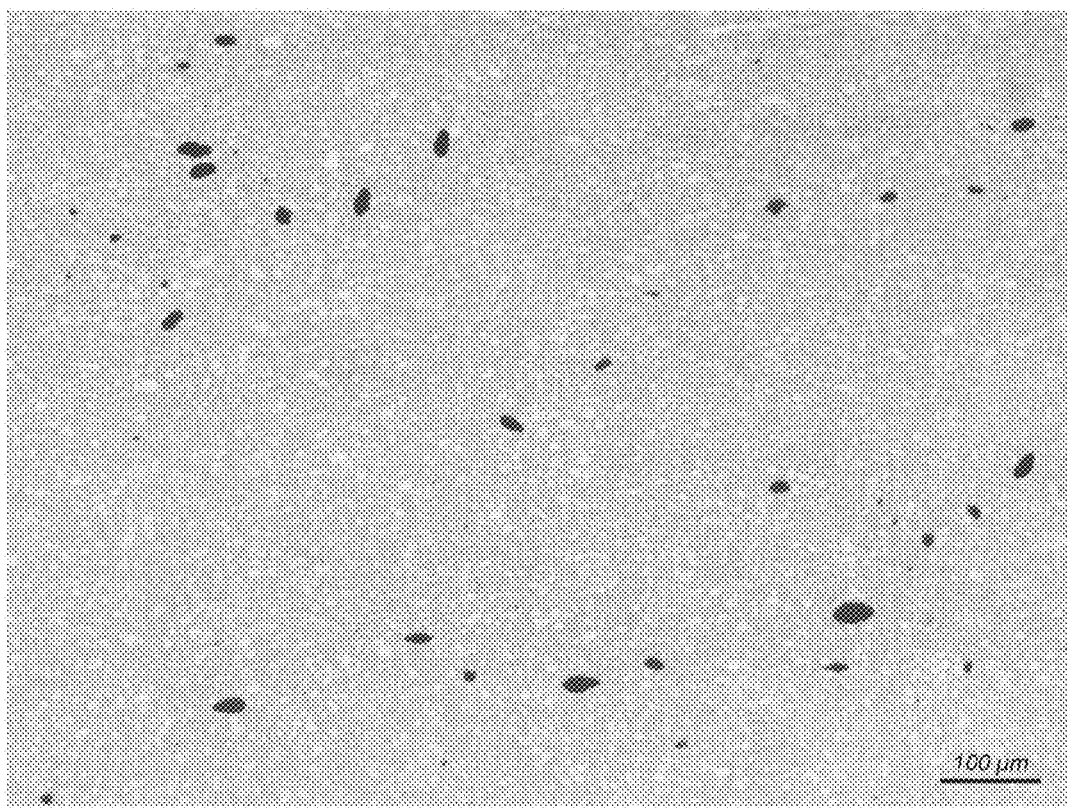
FIG. 1 is a picture showing CNT agglomerates on inventive example E2.

In the following passages, different aspects of the invention are defined in more detail. Each aspect no defined may be combined with any other aspect or aspects unless clearly indicated to the contrary. In particular, any feature indicated as being preferred or advantageous may be combined with any other feature or features indicated as being preferred or advantageous.

Definition of the Masterbatch and of the Composite Material

A masterbatch according to the invention comprises a blend of a first amorphous polymer with carbon nanotubes, with at least 5% and preferably from 5% to 15% by weight of carbon nanotubes based on the total weight of the masterbatch, and has a high load melt flow index HLMI1 of less than 40 g/10 min, preferably less than 30 g/10 min, more preferably of less than 20 g/10 min, most preferably less than 18 g/10 min according to ISO1133 (21.6 kg-200° C.).

The term "amorphous polymer" indicates a polymer that, because of its constitution, is unable to crystallize, i.e., a polymer that is not a crystallizable polymer. The glass transition temperature is the reversible transition in amorphous materials from a hard and relatively brittle state into a molten or rubber-like state. The glass transition temperature of an amorphous polymer can be determined by the method according to ISO 11357-2:2013.

The HLMI of the masterbatch is obtained by selecting the first amorphous polymer with a given HLMI1 and a suitable content of CNT blended with the polymer. Without being bound by a theory it is believed that the HLMI of the masterbatch is lower than the HLMI1 of the first amorphous polymer due to the presence of the CNT and due to the blending conditions in the process of preparation of the masterbatch. For a given HLMI1 of the first amorphous polymer, the HLMI of the masterbatch decreases while the content of CNT in the masterbatch increases.

In a preferred embodiment the masterbatch comprises at most 15%, preferably 13% by weight of carbon nanotubes based on the total weight of the masterbatch and has a surface resistivity of at most $1 \times 10^2$ Ohm/sq; preferably the masterbatch comprises at most 11% by weight of carbon nanotubes based on the total weight of the masterbatch and has a surface resistivity of at most $1 \times 10^2$ Ohm/sq.

The melt flow index MFI1 of the first amorphous polymer is at least 10 g/10 min as measured at 200° C. under a load of 5 kg according to ISO1133 H, preferably at least 15 g/10 min, preferably at least 18 g/10 min, preferably at least 20 g/10 min, more preferably at least 25 g/10 min. In an embodiment. MFI1 is at most 300 g/10 min, preferably at most 100 g/10 min, more preferably 60 g/10 min, most preferably 40 g/10 min.

It is noted, that if necessary, in order to determine its MFI, the first amorphous polymer may be extracted from the masterbatch using the following method:

1) Weigh a quantity of sample, taking into account ail the additives, to finally obtain the amount needed by the various analyzes requested on pure PS (to determine MFI, weigh about 7 g).

2) Dissolve the sample in a volume of Tetrahydrofuran (THF) with excess of Butylated hydroxytoluene (BHT)) corresponding to a solution of 1% (used a white bottle of sufficient volume to contain THF).

3) Turn on the shaker table used to GPC_BT (±50 rpm) for at least one night.

4) Use equipment vacuum filtration THF.

5) Then, filtered on sintered glass covered with a flat polytetrafluoroethylene (PTFE) filter 0.22 µm.

6) As soon as one realizes that the filtration is exercised almost, change the PTFE filter.

7) When the filtration is complete, rinse 3× bottle containing dissolved pellets.

8) Add a pinch of Aox (1076), corresponding to a few hundred ppm, to the filtered solution.

9) evaporated on a water bath (95° C.) in a large aluminum capsule.

10) Once evaporation is complete, to the capsule in an oven under vacuum at 80° C. for one night or until a completely dry residue.

11) Finally, let cool in a desiccator and determine MFI of pure PS recovered.

As used herein, the term "masterbatch" refers to concentrates of active material (such as the carbon nanotubes (CNT)) in a polymer, which are intended to be subsequently incorporated into another polymer (compatible or non-compatible with the polymer already contained in these masterbatches). Use of masterbatches makes processes more easily adaptable to industrial scale, compared to direct incorporation of CNT powder.

The masterbatch comprises at least 5% by weight of carbon nanotubes based on the total weight of the masterbatch. Preferably the masterbatch comprises at least 8% by weight of carbon nanotubes based on the total weight of the masterbatch. Preferably the masterbatch comprises at least 10% by weight of carbon nanotubes based on the total weight of the masterbatch.

Preferably the masterbatch comprises at most 15% by weight of carbon nanotubes based on the total weight of the masterbatch. Preferably the masterbatch comprises at most 13% by weight of carbon nanotubes based on the total weight of the masterbatch.

The masterbatch according to the invention is used to produce a composite material. The composite material according to the invention comprises a polymer composition and carbon nanotubes (CNT), wherein said polymer composition comprises a mixture of a first and a second amorphous polymer, said composite material comprises from 0.05 to 1.95% by weight of carbon nanotubes based on the total weight of the composite material, and further wherein said composite material has a surface resistivity of at most $1 \times 10^4$ Ohm/sq.

It is understood that the first amorphous polymer of the masterbatch is also the first amorphous polymer of the composite material. The other polymer in which the masterbatch is subsequently incorporated is the second amorphous polymer. Thus the process of preparing said masterbatch and the process of preparing the composite material include the definitions of the first and second amorphous polymer given in the description of the composite material and vice-versa.

The amorphous polymers considered by the invention for the first and second amorphous polymer are selected from polystyrene (PS), acrylonitrile-butadiene-styrene (ABS), polycarbonate (PC), styrene acrylonitrile (SAN), poly(methyl methacrylate) (PMMA), poly(vinyl chloride) (PVC), polybutadiene (PBu), polybutylene terephthalate (PBt), poly (p-phenylene oxide) (PPO), polysulfone (PSU), polyethersulfone (PES), polyethylenimine (PEI), polyphenylsulfone (PPSU), acrylonitrile styrene acrylate (ASA) or any combination thereof.

In a preferred embodiment the first amorphous polymer is polystyrene, modified polystyrene or a mixture of polystyrene and modified polystyrene, with preference the first amorphous polymer is polystyrene, for example general-purpose polystyrene (GPPS).

In an embodiment, the first and the second amorphous polymer differs from each other by the polymer-type. For example, one amorphous polymer is polystyrene and the other one is acrylonitrile-butadiene-styrene or styrene acrylonitrile. In another example one amorphous polymer is styrene acrylonitrile and the other one is a mixture of polystyrene and polybutadiene.

In an embodiment, the first and the second amorphous polymer differs from each other by the molecular weight.

In an embodiment, the first and the second amorphous polymer differs from each other by their melt flow index (MFI), the MFI being determined according to ISO 1133.

In a preferred embodiment the first and the second amorphous polymer are of the same polymer type and differ from each other by the molecular weight. In a preferred embodiment of the invention, both the first and the second amorphous polymer are chosen to be polystyrene, one of the first or second polystyrene has a molecular weight ranging from 80 000 to 120 000 g/mol whereas the other one has a molecular weight ranging from 160 000 to 240 000 g/mol. The polymer composition of the composite material shows bimodality. With preference the first amorphous polymer has the lowest molecular weight.

Non-limiting examples of suitable polystyrenes which can be used in the composition comprise polystyrene (for example General Purpose Polystyrene—GPPS), modified polystyrene (for example High Impact Polystyrene—HIPS), or combination of polystyrene and modified polystyrene.

Combination of polystyrene and modified polystyrene is to be understood as any mixture of polystyrene and modified polystyrene.

With preference, at least one of the first or second amorphous polymer is selected from polystyrene, modified polystyrene, or combination of polystyrene and modified polystyrene. In an embodiment both the first and the second amorphous polymer are selected from polystyrene, modified polystyrene, or combination of polystyrene and modified polystyrene. Preferably, in such an embodiment, the first and send amorphous polymers differ by their respective molecular weight and/or by their respective melt flow index.

In the modified-polystyrene, part of the styrene may be replaced by unsaturated monomers copolymerizable with styrene, for example alpha-methylstyrene or (meth)acrylates. Other examples which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers.

The polystyrenes for use in the present invention may be co- or homopolymers of styrene, alpha methyl styrene and para methyl styrene. Preferably the polystyrene is homopolystyrene.

The polystyrenes may be prepared by a number of methods. This process is well known to those skilled in the art. An example of method to produce polystyrene is given in EP2401311. An example of method to produce high impact polystyrene (HIPS) is given in US2012/0289656.

The modified-polystyrene for use in the composition may be rubber modified.

The rubber may be prepared by a number of methods, preferably by emulsion or solution polymerization. These processes are well known to those skilled in the art.

If present, preferably the rubber is present in an amount from about 3 to 15% by weight relative to the total weight of the modified-polystyrene. Polybutadiene is a particularly useful rubber.

Preferably the modified-polystyrene is rubber modified polystyrene.

In an embodiment, the rubber modified polystyrene is a High Impact Polystyrene (HIPS). The process for making HIPS is well known to those skilled in the art. For example, the process may comprise polymerizing styrene monomer in the presence of dissolved rubber. Polymerization of styrene, and optionally a comonomer, may be initiated by heating and/or by an initiator, by way of example a radical initiator. The rubber may be "dissolved" in the styrene monomer. The usual rubber types utilized in the manufacture of HIPS include polybutadiene (PBu), styrene-butadiene rubber (SBR), and styrene-butadiene-styrene rubber (SBS). Polystyrene may be initially formed from the styrene monomer within the homogeneous rubber solution in styrene. In HIPS, a part of the styrene may be replaced by unsaturated monomers copolymerizable with styrene such as other monovinylaromatic monomers, alkyl esters of acrylic or methacrylic acid and acrylonitrile. Non-limiting examples of suitable processes for preparing HIPS are described in US2010/240832, incorporated herein by reference.

Advantageously, the modified-polystyrene is a HIPS or a mixture of polystyrene and HIPS.

In an embodiment, the composite material comprises the melt blending product of said first and second amorphous polymer and said carbon nanotubes.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations comprising at least one of the foregoing machines. It is generally desirable during melt or solution blending of the composition to impart a specific energy of about 0.01 to about 10 kilowatt-hour/kilogram (kwhr/kg) of the composition. In a preferred embodiment, melt blending is performed in a twin screw extruder, such as a Brabender co-rotating twin screw extruder and/or a Leistritz extruder.

In an embodiment, the composite material comprises at most 1.75% by weight, for example at most 1.50% by weight, for example at most 1.25% by weight, for example at most 1.00% by weight, for example at most 0.95%, for example at most 090% by weight of carbon nanotubes, based on the total weight of the composite material.

In another embodiment, the composite material according to the invention comprises at least 0.05% preferably 0.10% by weight of carbon nanotubes, relative to the total weight of the composite material. For example, the composite material of the present invention can comprise at least 0.30% by weight of carbon nanotubes, for example at least 0.40% by weight, for example at least 0.45% by weight of carbon nanotubes, relative to the total weight of the composition, preferably at least 0.50% by weight, preferably at least 0.55% by weight, more preferably at least 0.60% by weight, more preferably at least 0.65% by weight, most preferably at least 0.70% by weight, relative to the total weight of the composite material.

In a preferred embodiment, the composite material comprises from 0.05 to 0.95% by weight of carbon nanotubes based on the total weight of the composite material, preferably from 0.30 to 0.95 wt %.

Suitable carbon nanotubes used in the present invention can generally be characterized by having a size from 1 nm to 500 nm, this definition of size can be limited to two dimensions only, i.e. the third dimension may be outside of these limits.

Suitable carbon nanotubes also referred to as "nanotubes" herein, can be cylindrical in shape and structurally related to fullerenes, an example of which is Buckminster fullerene ($C_{80}$). Suitable carbon nanotubes may be open or capped at their ends. The end cap may for example be a Buckminster-type fullerene hemisphere. Suitable carbon nanotubes used in the present invention can comprise more than 90%, more preferably more than 95%, even more preferably more than 99% and most preferably more than 99.9% of their total weight in carbon. However, minor amounts of other atoms may also be present.

Suitable carbon nanotubes to be used in the present invention can be prepared by any method known in the art.

They can be prepared by the catalyst decomposition of hydrocarbons, a technique that is called Catalytic Carbon Vapor Deposition (CCVD). Other methods for preparing carbon nanotubes include the arc-discharge method, the plasma decomposition of hydrocarbons or the pyrolysis of selected polyolefin under selected oxidative conditions. The starting hydrocarbons can be acetylene, ethylene, butane, propane, ethane, methane or any other gaseous or volatile carbon-containing compound. The catalyst, if present, is used in either pure or in supported form. The presence of a support greatly improves the selectivity of the catalysts but it contaminates the carbon nanotubes with support particles, in addition to the soot and amorphous carbon prepared during pyrolysis. Purification can remove these by-products and impurities. This can be carried out according to the following two steps:

1) the dissolution of the support particles, typically carried out with an appropriate agent that depends upon the nature of the support and
2) the removal of the pyrolytic carbon component, typically based on either oxidation or reduction processes.

Carbon nanotubes can exist as single-walled nanotubes (SWNT) and multi-walled nanotubes (MWNT), i.e. carbon nanotubes having one single wall and nanotubes having more than one wall, respectively. In single-walled carbon nanotubes a one atom thick sheet of atoms, for example a one atom thick sheet of graphite (also called graphene), is rolled seamlessly to form a cylinder. Multi-walled carbon nanotubes consist of a number of such cylinders arranged concentrically. The arrangement in a multi-walled carbon nanotubes can be described by the so-called Russian doll model, wherein a larger doll opens to reveal a smaller doll.

In an embodiment, the carbon nanotubes are multi-walled carbon nanotubes, more preferably multi-walled carbon nanotubes having on average from 5 to 15 walls.

Carbon nanotubes, irrespectively of whether they are single-walled or multi-walled, may be characterized by their outer diameter or by their length or by both.

Single-walled carbon nanotubes are preferably characterized by an outer diameter of at least 0.5 nm, more preferably of at least 1 nm, and most preferably of at least 2 nm. Preferably their outer diameter is at most 50 nm, more preferably at most 30 nm and most preferably at most 10 nm. Preferably, the length of single-walled nanotubes is at least 0.1 µm, more preferably at least 1 µm, even more preferably at least 10 µm. Preferably, their length is at most 50 mm, more preferably at most 25 mm.

Multi-walled carbon nanotubes are preferably characterized by an outer diameter of at least 1 nm, more preferably of at least 2 nm, 4 nm, 6 nm or 8 nm, and most preferably of at least 10 nm. The preferred outer diameter is at most 100 nm, more preferably at most 80 nm, 60 nm or 40 nm, and most preferably at most 20 nm. Most preferably, the outer diameter is in the range from 10 nm to 20 nm. The preferred length of the multi-walled nanotubes is at least 50 nm, more preferably at least 75 nm, and most preferably at least 100 nm. Their preferred length is at most 20 mm, more preferably at most 10 mm, 500 µm, 250 µm, 100 µm, 75 µm, 50 µm, 40 µm, 30 µm or 20 µm, and most preferably at most 10 µm. The most preferred length is in the range from 100 nm to 10 µm. In an embodiment, the multi-walled carbon nanotubes have an average outer diameter in the range from 10 nm to 20 nm or an average length in the range from 100 nm to 10 µm or both.

Preferred carbon nanotubes are carbon nanotubes having a surface area of 200-400 m$^2$/g (measured by Brunauer-Emmett-Teller (BET) method).

Preferred carbon nanotubes are carbon nanotubes having a mean number of 5-15 walls.

Non-limiting examples of commercially available multi-walled carbon nanotubes are Graphistrength™ 100, available from Arkema, Nanocyl™ NC 7000 available from Nanocyl, FloTube™ 9000 available from CNano Technology, Baytubes® C 150 B available from Bayer Material Science.

In an embodiment of the invention, the composite material comprises one or more additives selected from the group comprising an antioxidant, an antiacid, a UV-absorber, an antistatic agent, a light stabilizing agent, an acid scavenger, a lubricant, a nucleating/clarifying agent, a colorant or a peroxide. An overview of suitable additives may be found in Plastics Additives Handbook, ed, H. Zweifel, 5$^{th}$ edition, 2001, Hanser Publishers, which is hereby incorporated by reference in its entirety.

The invention also encompasses the composite material as described herein wherein the composite material comprises from 0% to 10% by weight of at least one additive such as antioxidant, based on the total weight of the composite material. In a preferred embodiment, said composite material comprises less than 5% by weight of additive, based on the total weight of the composite material, for example from 0.1 to 3% by weight of additive, based on the total weight of the composite material.

In an embodiment, the composite material comprises an antioxidant. Suitable antioxidants include, for example, phenolic antioxidants such as pentaerythritol tetrakis[3-(3',5'-di-tert-butyl-4'-hydroxyphenyl)propionate] (herein referred to as Irganox 1010), tris(2,4-ditert-butylphenyl)phosphite (herein referred to as Irgafos 168), 3DL-alpha-tocopherol, 2,6-di-tert-butyl-4-methylphenol, dibutylhydroxyphenyl-propionic acid stearyl ester, 3,5-di-tert-butyl-4-hydroxyhydrocinnamic acid, 2,2'-methylenebis(6-tert-butyl-4-methylphenol), hexamethylene bis[3-(3,5-di-tert-butyl-4-hydroxyphenyl)propionate], benzenepropanamide,N,N'-1,6-hexanediyl bis[3,5-bis(1,1-dimethylethyl)-4-hydroxy] (Antioxidant 1098), Diethyl 3.5-Di-Tert-Butyl-4-Hydroxybenzyl Phosphonate, Calcium bis[monoethyl(3,5-di-tert-butyl-4-hydroxylbenzyl)phosphonate], Triethylene glycol bis (3-tert-butyl-4-hydroxy-5-methylphenyl)propionate (Antioxidant 245), 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxospiro [5.5]undecane, 1,3,5-trimethyl-2,4,6-tris(3,5-di-tert-butyl-4-hydroxybenzyl)benzene, 1,1,3-tris(2-methyl-4-hydroxy-5-tert-butylphenyl)butane, (2,4,6-trioxo-1,3,5-triazine-1,3,5 (2H,4H,6H)-triyl)triethylene tris[3-(3,5-di-tert-butyl-4-hydroxyphenyl)propionate], tris(3,5-di-tert-butyl-4-hydroxybenzyl) isocyanurate. Tris(4-tert-butyl-3-hydroxy-2,6-dimethylbenzyl) isocyanurate, ethylene bis[3,3-bis(3-tert-butyl-4-hydroxyphenyl)butyrate], and 2,6-bis[[3-(1,1-dimethyl)-2-hydroxy-5-methylphenyl]octahydro-4,7-methano-1H-indenyl]-4-methyl-phenol. Suitable antioxidants also include, for example, phenolic antioxidants with dual functionality such 4,4'-Thio-bis(6-tert-butyl-m-methyl phenol) (Antioxidant 300), 2,2'-Sulfanediylbis(6-tert-butyl-4-methylphenol) (Antioxidant 2246-S), 2-Methyl-4,6-bis(octylsulfanylmethyl)phenol, thiodiethylene bis[3-(3, 5-di-tert-butyl-4-hydroxyphenyl)propionate], 2,6-di-tert-butyl-4-(4,6-bis(octylthio)-1,3,5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl] methyl]butylmalonate, 2,4-di-tert-butylphenyl 3,5-di-tert-butyl-4-hydroxybenzoate, hexadecyl 3,5-di-tert-butyl-4-hydroxy-benzoate, 2-(1,1-dimethylethyl)-6-[[3-(1,1- dimethylethyl)-2-hydroxy-5-methylphenyl] methyl]-4-methylphenyl acrylate, and Cas nr. 128961-68-2 (Sumilizer GS). Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-Phenyl-1-naphthylamine, CAS nr. 68411-46-1 (Antioxidant 5057), and 4,4-bis(alpha,alpha-dimethylbenzyl)diphenylamine (Antioxidant KY 405). Preferably, the antioxidant is selected from pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), or a mixture thereof.

The composite material may further comprise a styrenic copolymer, preferably wherein the styrenic copolymer is selected from styrene-butadiene-styrene block copolymer (SBS) or styrene-ethylene-butadiene-styrene block copolymer (SEBS).

Preferably, the styrenic copolymer is a styrenic block copolymer. Suitable styrenic block copolymers include at least two monoalkenyl arene blocks, preferably two polystyrene blocks, separated by a block of a saturated conjugated diene, such as a saturated polybutadiene block. Suitable unsaturated block copolymers include, but are not limited to, those represented by the following formulas: A-B-R(-B-A)$_n$ or A$_x$-(BA-)$_y$-BA wherein each A is a polymer block comprising a vinyl aromatic monomer, such as styrene, and each B is a polymer block comprising a conjugated diene, such as isoprene or butadiene, and optionally a vinyl aromatic monomer, such as styrene; R is the remnant of a multifunctional coupling agent (if R is present, the block copolymer can be a star or branched block copolymer); n is an integer from 1 to 5; x is zero or 1; and y is a real number from zero to 4.

The composite material according to the invention may have improved conductive-dissipative conductivity. The target resistivity may depend on the particular application (ANSI-ESD F 541-2008).

Preferably, the composite material has a surface resistivity of at most $5 \times 10^3$ Ohm/sq, with preference at most $4 \times 10^3$ Ohm/sq. The resistivity can be measured using the method described in ASTM-D257, or as described herein after in the example section.

The composite material comprises a portion of carbon nanotubes being in the form of agglomerates, with the agglomerate area fraction being less than 2.5% as determined in accordance with ASTM D-2663-14, preferably less than 2%, more preferably less than 1.5%, and most preferably less than 1%.

The composite material may be suitable for typical injection, extrusion and stretch blow molding applications, but also thermoforming, foaming and rotomolding. The articles made according to these processes can be mono- or multi-layer, wherein at least one of the layers comprises the composite material of the invention.

Articles made from the composite material may be commonly utilized in material-handling and electronic devices such as packaging film, sheets and thermoformed objects therefrom, chip carriers, computers, printers and photocopier components where electrostatic dissipation or electromagnetic shielding are important requirements. Preferably, the formed article comprises packaging. Preferably, the formed article comprises electronics packaging.

The invention provides new conductive-dissipative compositions and materials therefrom comprising low amounts of CNT, below 1.9 wt %, preferably below 1.5 wt %, more preferably below 1.0 wt %, most preferably below 0.9 wt % by weight of carbon nanotubes based on the total weight of the composite material.

Such composite materials are economically viable in comparison to usual conductive-dissipative compounds filled with carbon black, Definition of the Processes to Preparing a Masterbatch and a Composite Material The invention also relates to a process for preparing a masterbatch according to the above definition.

The inventive process for preparing a masterbatch comprises the steps of:
a1. providing carbon nanotubes;
a2. providing an first amorphous polymer, said first amorphous polymer having a glass transition temperature Tg1; and a melt flow index MFI1 of at least 10 g/10 min determined at 200° C. under a load of 5 kg according to ISO1133, and optionally from 0.01 to 4.0 by weight of one or more additive based on the total weight of the masterbatch, the one or more additive being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide;
a3. blending together said carbon nanotubes and said first amorphous polymer by extrusion in an extruder at a barrel temperature ranging from Tg1 to Tg1+80° C.

In an embodiment, the step a3) of blending together said carbon nanotubes and said first amorphous polymer by extrusion is conducted on co-rotating twin screw extruder at a screw speed of at least 250 RPM, with preference at least 300 RPM.

In an embodiment, the extrusion is performed in a extruder at a barrel temperature of at least Tg1+5° C., more preferably of at least Tg1+10° C. In another embodiment, the extrusion is performed in a extruder at a barrel temperature of at most Tg1+60° C., more preferably of at most Tg1+50° C.

Thus the masterbatch according to the invention are processed at low temperature and with an high screw speed.

To form a masterbatch, the CNT and polymer powders may be mixed in a mixer which is either integrated into the processing equipment, or positioned upstream of the latter.

This mixing of powders, blends and masterbatch, is carried in mixing equipment of the Brabender, Z-blade mixer or extruder type.

The present invention also encompasses a process for preparing the masterbatch according to the definition given above.

The inventive process for preparing a composite material according to the invention comprises the steps of:
b. providing a masterbatch comprising a first amorphous polymer and at least 5%, and preferably from 5% to 15%, by weight of carbon nanotubes based on the total weight of the masterbatch, and wherein the first amorphous polymer has a melt flow index MFI1 of at least 10 g/10 min;
c. providing a second amorphous polymer having a glass transition temperature Tg2;
d. blending together the masterbatch and the second amorphous polymer by extrusion in an extruder at a barrel temperature ranging from Tg2+100° C. to Tg2+200° C.

In a preferred embodiment the masterbatch used in said process is a masterbatch according to the definition given above.

In an embodiment, the extrusion is performed in a extruder at a barrel temperature of at least Tg2+110° C., more preferably of at least Tg2+120° C. In another embodiment, the extrusion is performed in a extruder at a barrel temperature of at most Tg2+180° C., more preferably of at most Tg2+170° C.

In a preferred embodiment the second amorphous polymer is modified polystyrene, with preference the second amorphous polymer is HIPS.

In an embodiment, the process for preparing a composite material according to the invention includes before the step b) of providing a masterbatch, a step of preparation of a masterbatch as defined above.

In a preferred embodiment, the first amorphous polymer having a melt flow index MFI1 and second amorphous polymer having a melt flow index MFI2, the process for preparing a composite material according to the invention further comprises the step of selecting the first and second amorphous polymer so that MFI1 has a value of at least twice the value of MFI2. With preference, MFI1 has a value of at least three times the value of MFI2. Preferably, the melt flow index MFI2 is at most 5 g/10 min, more preferably at most 4 g/10 min.

Using first amorphous polymer more fluid than the second one ease to dilute the masterbatch comprising such first amorphous polymer in the second amorphous polymer. Moreover, as for the dispersion of primary CNT agglomerates, the infiltration process of matrix polymer chains into the pores of the agglomerate is the first step; the infiltration is more faster with fluid resins. Using a second amorphous polymer with high viscosity eases the masterbatch to be distributed in said second amorphous polymer when preparing the composite material. Indeed, highly viscous masterbatch is difficult to disperse homogeneously within low viscosity resins.

According to the invention, the first amorphous polymer is processed at a low extrusion temperature during the masterbatch preparation so that the viscosity of said first amorphous polymer is high and high shear stress is applied to primary CNT agglomerates which reduce their size, increasing the dispersibility of the CNT.

According to the invention, the masterbatch is blended h the second amorphous polymer at high temperature no that the viscosity of the first amorphous polymer is lower and the mobility of the CNT is then higher in order to favor the nanoagglomeration of the CNT leading to the formation of electrical percolation of CNT. The percolation is facilitated if CNT mobility is less restricted.

Preferably the second amorphous polymer is characterized by a high load melt flow index HLMI2 of more than 30 g/10 min according to ISO1133 (21.6 kg-200° C.), preferably more than 40 g/10 min, preferably more than 50 g/10 min.

The present invention can be further illustrated by the following examples, although it will be understood that these examples are included merely for purposes of illustration and are not intended to limit the scope of the invention unless otherwise specifically indicated.

EXAMPLES

Blends according to embodiments of the invention were prepared using a two step process. The inventive blends comprised polystyrene, high-impact polystyrene and carbon nanotubes.

Methods

The content of carbon nanotubes in % by weight in blends (% CNT) can be determined by thermal gravimetric analysis (TGA) according to ISO 11358 and ASTM E1131, using a Mettler Toledo STAR TGA/DSC 1 apparatus. Prior to the determination of the content of carbon nanotubes in % by weight in blends (% CNT), the carbon content of the carbon nanotubes in % by weight (% C-CNT) was determined: 2 to 3 milligrams of carbon nanotubes were placed into a TGA. The material was heated at a rate of 20° C./min from 30° C. to 600° C. in nitrogen (100 ml/min). At 600° C., the gas was switched to air (100 ml/min), and the carbon oxidized, yielding the carbon content of the carbon nanotubes in % by weight (% C-CNT). The % C-CNT value was the average of 3 measurements. For the content of carbon nanotubes % by weight in blends (% CNT), 10 to 20 milligrams of sample was placed into a TGA. The material was heated at a rate of 20° C./min from 30° C. to 600° C. in nitrogen (100 ml/min). At 600° C., the gas was switched to air (100 ml/min), and the carbon oxidized, yielding to the carbon content of carbon nanotubes in the sample (% C-sample). The % C-sample value was the average of 3 measurements. The content of carbon nanotubes % by weight in sample (% CNT) was then determined by dividing the carbon content of carbon nanotubes % by weight in samples (% C-sample) by the carbon content of the carbon nanotubes in % by weight (% C-CNT) and multiplying by 100.

% CNT=% $C$-sample/% $C$-CNT*100

The surface resistivity (SR) of the blend was measured using a 2410 SourceMeter® apparatus. Conditions which were used were similar to those described in the CEI 60167 and NF C26-215 test methods. The surface resistivity (SR) was measured on 2 mm thick compression molded plaque at 200° C. during 12 minutes. The resistance measurement was performed using an electrode system made of two conductive paint lines using silver ink and an adhesive mask presenting 2 parallel slits 25 mm long, 1 mm wide and 2 mm apart. The samples were conditioned at 23° C./50% RH for minimum 4 hours before running the test. The measure of the resistance in ohm was reported to a square measurement area and expressed in ohm/square using the following equation: SR=(R×L)/d, wherein: SR is the average resistance reported to a square measurement area, conventionally called surface resistivity (expressed in ohm/sq), R is the average of the resistance measurements (ohm), L is the paint line length (cm), d is the distance between the electrodes (cm). L=2.5 cm and d=0.2 cm and SR=R×12.5. The surface resistivity (SR) value was the average of 3 measurements.

The melt flow index (MFI) is the weight of polymer melt flowing out from a standard die (2.095×8 mm) at a given temperature and with a standard weight applied to the piston, which pushing the sample. The MFI was determined under a load of 5 kg at a temperature of 200° C. according to ISO 1133 H.

The high melt flow index (HLMI) was determined under a load of 21.6 kg at a temperature of 200° C. according to ISO 1133.

Density of the polymers is determined according to ISO 1183

The molecular weight of the polymers was measured by Gel Permeation Chromatography (GPC).

The glass transition temperature can be determined by the method according to ISO 11357-2:2013.

The agglomerate area fraction (U %) is determined in accordance with ASTM D-2663-14

Example 1: Preparation of the Masterbatch

Inventive Examples of Masterbatch M1 to M4

The carbon nanotubes used are multi-walled carbon nanotubes Nanocyl™ NC 7000, commercially available from Nanocyl. These nanotubes have a surface area of 250-300 m$^2$/g (measured by BET method), a carbon purity of about 90% by weight (measured by thermal gravimetric analysis), an average diameter of 9.5 nm and an average length of 1.5 μm (as measured by transmission electron microscopy).

The first amorphous polymer used is polystyrene with a melt flow index of 30 g/10 mn as measured according to ISO 1133 H (200° C.-5 kg), a density of 1.05 g/cm$^3$ (ISO 1183), a flexural modulus of 2900 MP (ISO 178), a surface resistivity>10$^{14}$ Ohms as measured according to ISO IEC 93. The molecular weight of the first amorphous polymer is Mw: 112 000 g/mol. Thus, the melt flow index of the first amorphous polymer is at least 10 g/10 min. The polystyrene shows a glass transition temperature Tg of 104° C. (i.e.: Tg1).

The masterbatches are prepared by blending polystyrene and carbon nanotubes, using classical twin-screw extrusion process. Carbon nanotubes powder and polystyrene is introduced into the extruder such as to obtain a CNT content of about 10% by weight based on the total weight of the blend. The masterbatches are blended on Leitztriz co-rotating twin screw extruder with a L/D of 52 (D=27), at an barrel temperature of 110-145° C. for M1 and M2, and at a barrel temperature of 160-175° C. for M3 and M4.

The melt temperature measured with thermocouple shows that the material has a temperature in the barrel of about 150° C. to 200° C. The melt temperature could be lowered by using a better cooling device on the extruder.

For inventive Masterbatch M1 the screw speed is fixed at 250 RPM, at a throughput of 14 kg/h. For inventive Masterbatch M2 to M4 the screw speed is fixed at 500 RPM, at a throughput of 14 kg/h. Additives have been introduced in M3 and M4.

The barrel temperature is comprised between Tg1 to Tg1+80° C., here between 104° C. to 184° C.
Comparative Example of Masterbatch CM1 to CM3

CM1 is a commercially available masterbatch, known as CNano Technology CP320-07. CM1 contains polystyrene and 7 wt % FloTube™ 9000 carbon nanotubes, based on the total weight of the masterbatch. The melt flow index of the polymer used in CM1 is not known but the datasheet of the product states that when diluted to 3.5 wt % loading, the melt flow index of the masterbatch is 1.5 g/10 min (200° C./5 kg according to ASTM D1238).

CM2 is a commercially available masterbatch known as TNHIPS and sold by Timesnano. CM2 contains modified polystyrene and 10 wt % of TNIM4 carbon nanotubes, based on the total weight of the masterbatch. The melt flow index of the modified polystyrene (HIPS) used in the CM2 is 2.7 g/10 min (200° C./5 kg according to ASTM D1238).

CM3 is a masterbatch prepared by blending polystyrene and carbon nanotubes, using classical twin-screw extrusion process. High impact polystyrene (HIPS) Total 8350 was blended with powdered carbon nanotubes (CNT) such as to obtain a CNT content of about 10% by weight based on the total weight of the blend. The masterbatch is blended on Leitztriz co-rotating twin screw extruder with a L/D of 52 (D=27), at an barrel temperature of 190-210° C. The carbon nanotubes used are multi-walled carbon nanotubes Nanocyl™ NC 7000, commercially available from Nanocyl. The melt flow index of the modified polystyrene (HIPS) used in the CM2 is 4.5 g/10 min (200° C./5 kg according to ASTM D1238).

The results are given in Table 1. From the results it can be seen that the inventive masterbatches have an HLMI (21.6 kg 200° C. in accordance to ISO1133) of less than 20 g/10 min, contrary to the commercially available masterbatches. The inventive masterbatches show improvement of the surface resistivity properties compared to the commercially available masterbatches. The inventive masterbatches show an improvement in the dispersion of the CNT in comparison to comparative masterbatch CM3, said improvement in dispersion is evidenced on the composite material as it is seen in Example 2.

TABLE 1

| | Masterbatches | | | | | | |
|---|---|---|---|---|---|---|---|
| Blends | M1 | M2 | M3 | M4 | CM1 | CM2 | CM3 |
| PS (wt %) | 90 | 90 | 88 | 89.7 | 93 | 80$^{(1)}$ | 90 |
| PS MFI (g/10 min) | 30 | 30 | 30 | 30 | unknow | 2.7 | 4.5 |
| CNT (wt %) | 10 | 10 | 10 | 10 | 7 | 10 | 10 |
| additive | no | no | EBS | ZnSt | unknow | unknow | no |
| additive (wt %) | — | — | 2 | 0.3 | — | — | — |
| screw speed (RPM) | 250 | 500 | 500 | 500 | unknow | unknow | 250 |
| throughput (kg/h) | 14 | 14 | 14 | 14 | unknow | unknow | 14 |
| barrel temperature (° C.) | 110-145 | 110-145 | 160-175 | 160-175 | unknow | unknow | 190-210 |
| melt temperature (° C.) | 155 | 180 | 177 | 177 | unknow | unknow | not determined |
| HLMI (g/10 min) of the blend | 15.8 | 6.7 | 7.7 | 8.0 | 52.4 | 53.8 | 2.4 |
| SR (ohm/sq) | 3.1 × 10$^1$ | 2.8 × 10$^1$ | 2.9 × 10$^1$ | 4.5 × 10$^1$ | 2.2 × 10$^3$ | 1.7 × 10$^2$ | 4.2 × 10$^1$ |

$^{(1)}$the PS used is modified polystyrene HIPS, CM2 comprise 80 wt % of HIPS, 10 wt % of SBS and 10 wt % of CNT based on the total weight of the masterbatch.

Example 2: Preparation of the Composite Material

The second amorphous polymer is modified polystyrene: high impact polystyrene. The same second amorphous polymer is chosen for both inventive and comparative examples.

Inventive Examples

The high impact polystyrene (HIPS) selected in accordance to the invention has a melt flow index of 2.8 g/10 mn as measured according to ISO 1133 H (200° C.-5 kg), a density of 1.04 g/cm$^3$ (ISO 1183), a flexural modulus of 1600 MP (ISO 178), a surface resistivity>$10^{13}$ Ohms as measured according to ISO IEC 93. The melt flow index of the second amorphous polymer is not more that 5 g/10 min. The HIPS shows a glass transition temperature of 100° C. (i.e. Tg2). The molecular weight of the second amorphous polymer is Mw: 225 000 g/mol.

The HIPS is chosen so as the melt flow index of the first amorphous polymer used in the inventive masterbatches has a melt flow index higher than the second amorphous polymer. In particular the melt flow index of the first amorphous polymer has a value (i.e 30 g/min) of at least twice the value of the melt flow index of the second amorphous polymer (i.e. 2.8 g/min).

Example E1—Composite Material Containing 1 wt % of CNT

In the dilution step, the masterbatch is blended with the second amorphous polymer, using classical single-screw extrusion process. Both first and second polymer composition are introduced in the extruder through the hopper. The extrusion is conducted in brabender single-screw extruder using with a L/D of 25 (D=19) at a barrel temperature of 200° C. and the screw speed is fixed at 60 RPM Examples E2 to E4—Composite Material Containing 0.9 wt % of CNT In the dilution step, the masterbatches are blended with the second amorphous polymer, using classical twin-screw extrusion process. Both first and second polymer composition are introduced in the extruder through the main feed. The extrusion is conducted in brabender twin-screw extruder with a L/D of 40 (D=20), at a barrel temperature of 220-260° C. and the screw speed is fixed at 80 RPM, at a throughput of 2 kg/h.

The barrel temperature is between Tg2+120° C. to Tg1+200° C., here between 220° C. to 300° C.

Comparative Examples

Comparative examples are produced using the same process and second amorphous polymer than the inventive examples. The difference lies in the masterbatches used.

The results are given in Table 2. From the results it can be seen that the dilution of the inventive masterbatches according to the inventive process provide composite material having a good surface resistivity even at low concentration in carbon nanotubes. The inventive composite materials show better surface resistivity than the comparative composites materials produced from the commercially available. The inventive process demonstrates an improvement of the surface resistivity properties on the composite material obtained with an increase of the barrel temperature used for the extrusion.

Figure 2:
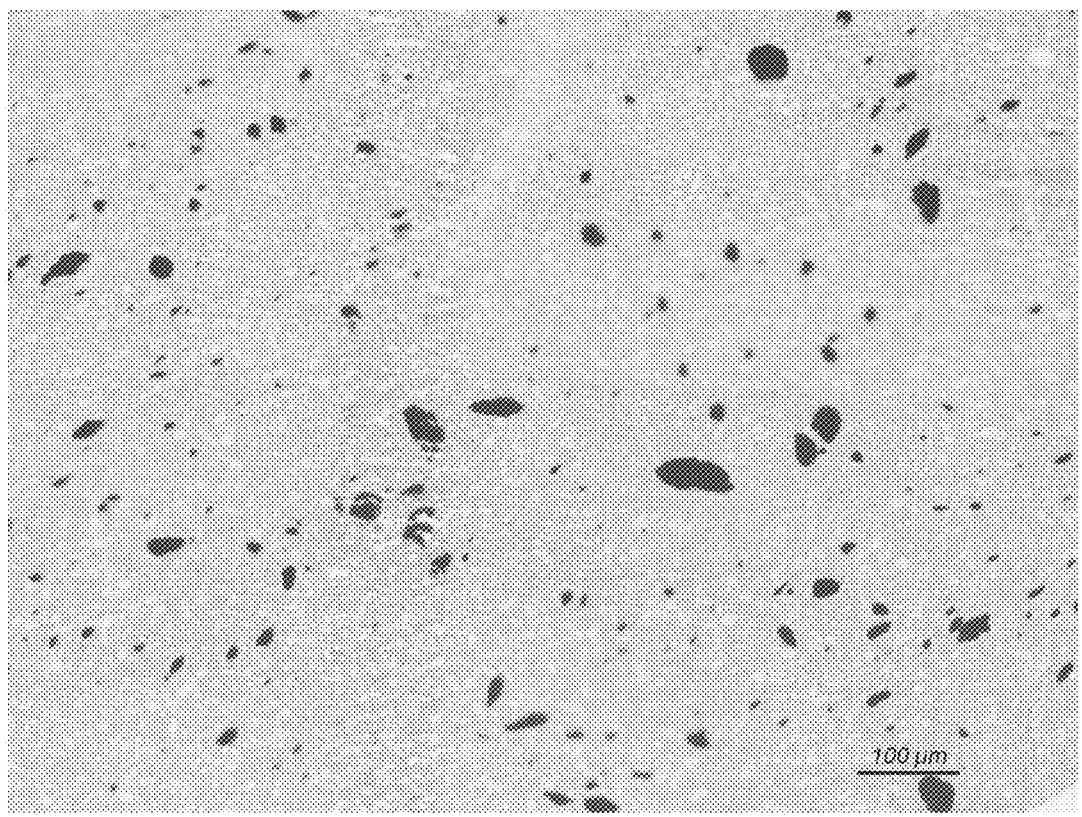
FIG. 2 is a picture showing CNT agglomerates on comparative example C4.

The attention is drawn in particular on Examples E2 and C4 for which the agglomerate area fraction has been determined. E2 shows improvement of the surface resistivity properties that the comparative examples, but also an improvement in the agglomerate area fraction compared to C4, FIGS. 1 and 2 show the CNT agglomerates on the composite of Example E2 and C4 respectively.

It is believed that the good results obtained regarding the surface resistivity properties have been obtained by an improvement in the dispersion of the CNT, first in the masterbatch then by the dilution of the masterbatch in the second amorphous polymer. Without being bound by a theory, it is believed that the choice of the first amorphous polymer used in the masterbatch as well as the process of preparation of the masterbatch influences the quality of dispersion of the CNT in the masterbatch as it can be seen by the comparison between E2 and C4.

TABLE 2

| | composite material | | | | | | | |
|---|---|---|---|---|---|---|---|---|
| Blends | E1 | E2 | E3 | E4 | C1 | C2 | C3 | C4 |
| wt % HIPS | 90 | 90 | 90 | 90 | 87.14 | 87.14 | 87.14 | 90 |
| HIPS MFI (g/10 min) | 2.8 | 2.8 | 2.8 | 2.8 | 2.8 | 2.8 | 2.8 | 2.8 |
| Masterbatch | M2 | M2 | M2 | M2 | CM1 | CM1 | CM1 | CM3 |
| Masterbatch wt % | 10 | 9 | 9 | 9 | 12.86 | 12.86 | 12.86 | 9 |
| wt % CNT | 1 | 0.9 | 0.9 | 0.9 | 0.9 | 0.9 | 0.9 | 0.9 |
| screw speed RPM | 60 | 80 | 80 | 80 | 80 | 80 | 80 | 80 |
| throughput kg/h | — | 2 | 2 | 2 | 2 | 2 | 2 | 2 |
| barrel temperature T ° C. | 200 | 220 | 240 | 260 | 220 | 240 | 260 | 220 |
| SR (ohm/sq) | $5.4 \times 10^3$ | $7.2 \times 10^3$ | $1.8 \times 10^3$ | $8.5 \times 10^2$ | $1.0 \times 10^7$ | $4.2 \times 10^4$ | $2.6 \times 10^4$ | $5.4 \times 10^5$ |
| U (%) | — | 0.77 ± 0.44 | — | — | — | — | — | 2.91 ± 0.55 |

The invention claimed is:

1. A masterbatch for use in a process of preparing a composite material, the masterbatch comprising a blend of a first amorphous polymer with carbon nanotubes, at least 5% by weight of carbon nanotubes based on the total weight of the masterbatch as determined according to ISO 11358, and having a high load melt flow index HLMI1 of less than 40 g/10 min determined at 200° C. under a load of 21.6 kg according to ISO1133, the masterbatch being characterized in that the first amorphous polymer has a melt flow index MFI1 of at least 10 g/10 min determined at 200° C. under a load of 5 kg according to ISO1133H, wherein the first amorphous polymer is selected from the group consisting of polystyrene, modified-polystyrene, acrylonitrile-butadiene-styrene, polycarbonate, styrene acrylonitrile, poly(methyl methacrylate), poly(vinyl chloride), polybutadiene, polybutylene terephthalate, poly(p-phenylene oxide), polysulfone, polyethersulfone, polyethylenimine, polyphenylsulfone, acrylonitrile styrene acrylate and any combination thereof, wherein the masterbatch comprises at least 80% by weight of the first amorphous polymer, and wherein the masterbatch comprises a surface resistivity of at most $1 \times 10^2$ Ohm/sq as determined according to CEI 60167.

2. The masterbatch according to claim 1 characterized in that it has a high load melt flow index HLMI1 of less than 20 g/10 min determined at 200° C. under a load of 21.6 kg according to ISO1133.

3. The masterbatch according to claim 1 characterized in that it further comprises from 0.01 to 4.0 by weight of one or more additive based on the total weight of the masterbatch, the one or more additive being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide.

4. The masterbatch of claim 1, wherein the first amorphous polymer is a polystyrene or a modified-polystyrene.

5. The masterbatch of claim 1, further comprising a second amorphous polymer, wherein the second amorphous polymer is different than the first amorphous polymer.

6. The masterbatch of claim 5, wherein the second amorphous polymer has a different molecular weight than the first amorphous polymer.

7. The masterbatch of claim 5, wherein the second amorphous polymer comprises a modified polystyrene.

8. The masterbatch of claim 5, wherein the second amorphous polymer comprises a different melt flow index (MFI) than the first amorphous polymer.

* * * * *